(12) United States Patent
Ashiura et al.

(10) Patent No.: US 8,034,868 B2
(45) Date of Patent: Oct. 11, 2011

(54) RUBBER COMPOSITION CONTAINING MODIFIED CONJUGATED DIENE-BASED POLYMER BONDED TO FULLERENE

(75) Inventors: Makoto Ashiura, Hiratsuka (JP); Tetsuji Kawazura, Hiratsuka (JP); Fumito Yatsuyanagi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 442 days.

(21) Appl. No.: 12/406,188

(22) Filed: Mar. 18, 2009

(65) Prior Publication Data

US 2009/0182069 A1 Jul. 16, 2009

Related U.S. Application Data

(62) Division of application No. 10/553,963, filed as application No. PCT/JP2004/006200 on Apr. 28, 2004, now abandoned.

(30) Foreign Application Priority Data

May 15, 2003 (JP) .................................. 2003-137708
Mar. 3, 2004 (JP) .................................. 2004-059470

(51) Int. Cl.
   *C08K 3/04* (2006.01)
   *B60C 1/00* (2006.01)
   *C08L 23/18* (2006.01)
   *C08L 23/26* (2006.01)

(52) U.S. Cl. ........ 524/495; 524/439; 524/576; 524/575; 524/571; 524/577; 524/579; 524/442; 525/331.9; 525/332.9; 152/209.1

(58) Field of Classification Search .................. 524/495, 524/439, 576; 525/332.9
See application file for complete search history.

(56) References Cited

U.S. PATENT DOCUMENTS

| | | | |
|---|---|---|---|
| 3,923,722 A | 12/1975 | Lakshmanan | |
| 5,082,285 A | 1/1992 | Hamada et al. | |
| 5,087,668 A | 2/1992 | Standstrom et al. | |
| 5,270,394 A * | 12/1993 | Hoxmeier | 525/232 |
| 5,281,653 A * | 1/1994 | Thomann et al. | 524/490 |
| 5,462,680 A * | 10/1995 | Brois et al. | 508/110 |
| 5,750,615 A * | 5/1998 | Lukich et al. | 524/495 |
| 6,186,202 B1 | 2/2001 | Majumdar et al. | |

FOREIGN PATENT DOCUMENTS

| | | |
|---|---|---|
| JP | 59-12948 | 1/1984 |
| JP | 10-168238 | 6/1998 |
| JP | 2002-253703 | 9/2002 |
| JP | 2004-308836 A * | 11/2004 |
| RU | 2 151 781 C1 * | 10/1997 |
| WO | WO 94/11423 A1 * | 5/1994 |

OTHER PUBLICATIONS

Ederle, Y.; Mathis, C. Macromolecules 1997, 30, 2546-2555.*
Cataldo et al., Fullerenes, Nanotubes, and Carbon Nanostructures 2003, 11, 395-408.*
Jiang et al., Polym. Bulletin 1997, 38, 545-549.*
Dai et al., J. Phys. Chem. 1995, 99, 17302-17304.*
Akiba, M. "The Role of C60 Fullerene in Rubbers and Elastomers," Porima Daijesuto, 1997, 49 (7), 7-23.*
Cataldo, F. "The role of fullerene-like structures in carbon black and their interaction with diene rubber." Fullerene Science and Technology, 2000, 8 (1&2), 105-112.*
Y. Ederle, et al., "Grafting of Anionic Polymers Onto $C_{60}$ OM Polar and Nonpolar Solvents", Macromolecules 1997, 30, pp. 2546-2555.
International Search Report (May 20, 2004).

* cited by examiner

*Primary Examiner* — Rip A. Lee
(74) *Attorney, Agent, or Firm* — Connolly Bove Lodge & Hutz LLP

(57) ABSTRACT

A rubber composition obtained by compounding thereinto a rubber component containing 0.5 to 100% by weight of a modified conjugated diene-based polymer having a fullerene bonded thereto in the molecule and having a weight average molecular weight of 50,000 or more excellent processability, superior balance of modulus and heat buildup, excellent cold flowability and superior tan δ balance.

12 Claims, 2 Drawing Sheets

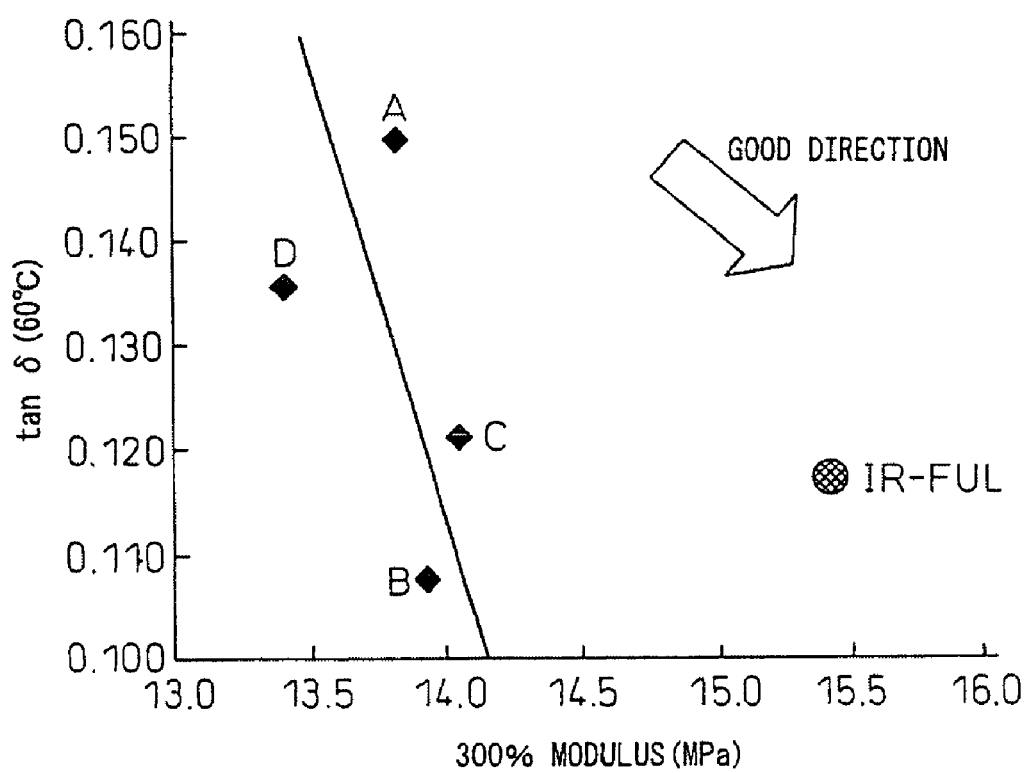

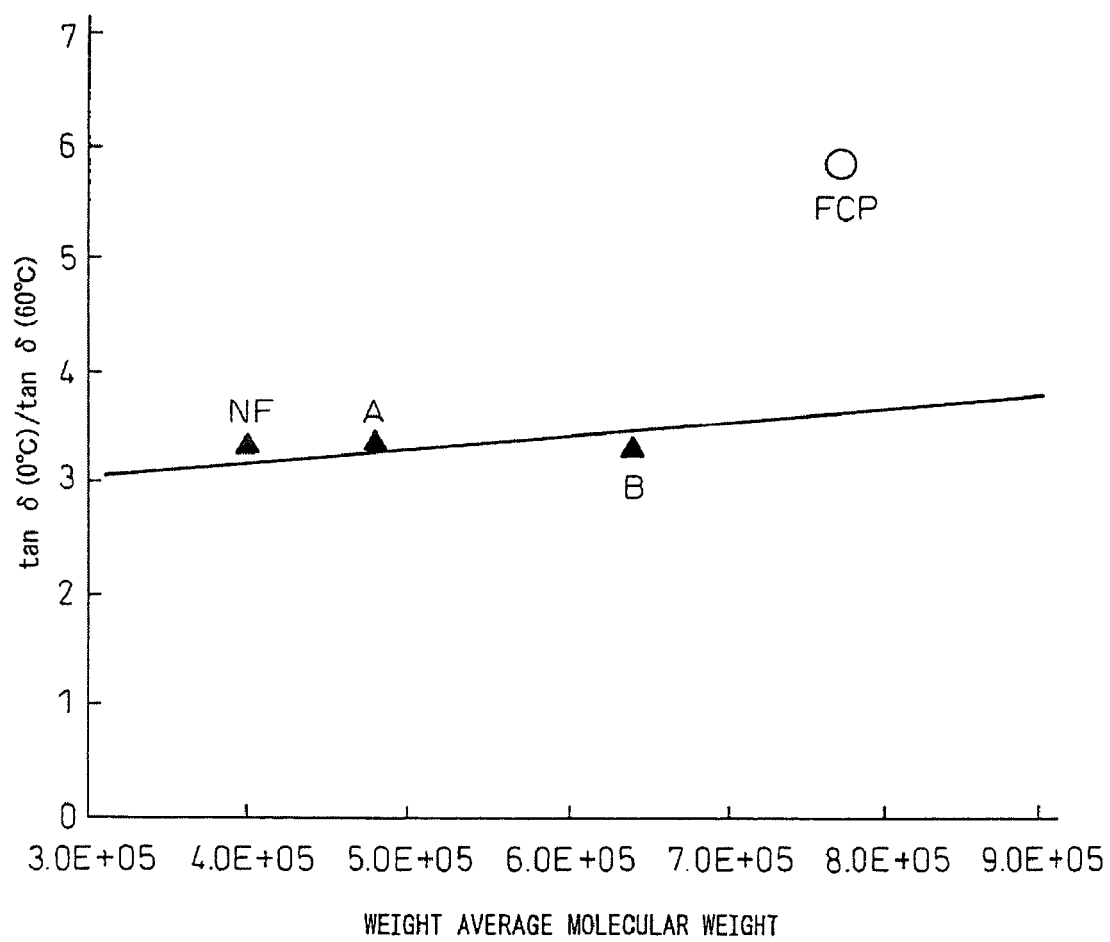

RUBBER COMPOSITION CONTAINING MODIFIED CONJUGATED DIENE-BASED POLYMER BONDED TO FULLERENE

This application is a Divisional of application Ser. No. 10/553,963, filed on Oct. 19, 2005, now abandoned, and for which priority is claimed under 35 U.S.C. §120; and which is the National Stage of International Application No. PCT/JP2004/006200 filed on Apr. 28, 2034; and this application claims priority of Application No. 2003-137708 filed in Japan on May 15, 2003 and Application No. 2004-059470 filed in Japan on Mar. 3, 2004 under 35 U.S.C. §119; the entire contents of all these applications are hereby incorporated by reference.

TECHNICAL FIELD

The present invention relates to a rubber composition containing a modified conjugated diene-based polymer having a bonded fullerene in the molecule thereof. More specifically, it relates to a rubber composition containing a modified diene-based polymer having an excellent processability, superior balance between the modulus and the heat buildup, excellent cold flowability and superior tan δ balance with a low tan δ value at 60° C. and high tan δ value at 0° C.

BACKGROUND ART

A fullerene is a spherical compound consisting of only carbon atoms. The term includes higher order fullerenes consisting of 60 carbon atoms ($C_{60}$) and higher even numbers of carbon atoms. These include 12 five-member rings and 20 or more five-member rings, six-member rings or seven-member rings. It has been learned in recent years that the most representative $C_{60}$ is a molecule extremely high in reactivity due to its special electron system. This reactivity is utilized for various types of chemical modification. Blending a spherical carbon molecule fullerene into a rubber component, as a filler, is described in, for example, Japanese Patent Publication (A) No. 10-168238. Further, polymerizing isoprene by living anion polymerization and modifying its terminals by a fullerene is described in, for example, *Macromolecules* 1997, 30, 2546-2555. However, it has not been known that the conjugated diene-based polymer synthesized by the method described in *Macromolecules* is useful as a rubber composition.

DISCLOSURE OF THE INVENTION

The objects of the present invention are to provide a rubber composition containing a modified conjugated diene-based copolymer obtained by chemically bonding a fullerene to a conjugated diene-based polymer and having superior physical properties, more particularly a rubber composition having superior processability, high modulus and superior balance of the modulus and the heat buildup as well as a rubber composition with an excellent cold flowability and a superior tan δ balance of a low tan δ value at 60° C. and a high tan δ value at 0° C.

In accordance with the present invention, there is provided a rubber composition comprising 100 parts by weight of a rubber component containing a modified conjugated diene-based polymer having fullerene bonded thereto in the molecule and a weight average molecular weight of 50,000 or more in an amount of 0.5 to 100% by weight based upon the total amount of the rubber component and 5 to 100 parts by weight of a reinforcing filler.

According to the present invention, as shown below, a rubber composition having excellent processability and modulus, superior balance of the modulus and the heat buildup, excellent cold flowability and superior tan δ balance can be obtained.

BRIEF DESCRIPTION OF THE DRAWINGS

The present invention will be explained with reference to the following figures, in which FIG. 1 is a graph showing the relationship between the tan δ (60° C.) and 300% modulus of Example 1 and Comparative Examples 1 to 4, and FIG. 2 is a graph showing the relationships between the weight average molecular weight and tan δ balance in the Example 2 and Comparative Examples 5 to 7.

BEST MODE FOR CARRYING OUT THE INVENTION

As explained above, a fullerene is a spherical compound consisting solely of carbon atoms and the term includes higher order fullerenes composed of 60 carbon atoms ($C_{60}$) or higher even numbers of carbon atoms. These include 12 five-member rings and 20 or more five-member rings, six-member rings or seven-member rings. As typical examples, $C_{60}$, $C_{70}$, $C_{76}$, $C_{78}$, $C_{82}$, $C_{84}$, $C_{90}$, $C_{96}$, $C_{120}$, etc. may be mentioned. It is known that the most representative $C_{60}$ is a molecule extremely high in reactivity due to the special electron system thereof. This reactivity is utilized for various types of chemical modification. Further, due to the special electron system and large size of the molecule, a polymer having a fullerene in the molecule thereof is expected to exhibit unique properties in terms of the electrical, magnetic, mechanical, and thermal characteristics thereof and is expected as a functional material.

The inventors found that, by synthesizing a conjugated diene-based polymer having a fullerene bonded to the molecule thereof and compounding it to a rubber composition, an excellent processability, high modulus, and superior balance of the modulus and the heat buildup thereof are exhibited, further an excellent cold flowability is exhibited, and, when considered as a tread rubber for a tire, the tan δ (60° C.) value usable as an indicator of the rolling resistance is low, the tan δ (0° C.) value usable as an indicator of the wet skid resistance is high, that is, the desired superior tan δ balance is exhibited, and thereby completed the present invention.

The fullerene-modified conjugated diene-based polymer compounded in the rubber composition according to the present invention has a weight average molecular weight of 50,000 or more, preferably 100,000 to 2,000,000, and constitutes 0.5 to 100% by weight, preferably 10 to 100% by weight, of the rubber ingredient compounded in the rubber composition. The amount of modification by the fullerene is not particularly limited, but is preferably 0.001 to 2 molecules, more preferably 0.01 to 2 molecules, per chain of the modified conjugated diene-based polymer.

If the weight average molecular weight of the fullerene-modified conjugated diene-based polymer is less than 50,000, it is not preferable became, since the molecular weight is too low, the effect obtained by the modification is cancelled out. If the compounding amount the fullerene-modified conjugated diene-based polymer in the rubber component compounded into the rubber composition of the present invention is too small, it is not preferable because the desired physical properties cannot be obtained.

The modified conjugated diene-based polymer having a fullerene in the molecule, which is compounded into the rubber composition according to the present invention, can be synthesized, for example, by reacting the growing terminal anions of the conjugated diene-based polymer formed by anion polymerization and the fullerene. Examples of such synthesized polymer are those synthesized by reacting the growing terminal anions of a copolymer obtained by an anion polymerization of an aromatic vinyl monomer and a conjugated diene monomer, as a conjugated diene-based polymer, and a fullerene. Examples of such an aromatic vinyl monomer, are styrene, α-methylstyrene, 2-methylstyrene, 3-methylstyrene, 4-methylstyrene, 2,4-diisopropylstyrene, 2,4-dimethylstyrene, 4-t-butylstyrene, etc. Among these, styrene is preferable. Examples of the conjugated diene monomer, are 1,3-butadiene, 2,3-dimethyl-1,3-butadiene, 1,3-pentadiene, 2-methyl-1,3-butadiene (i.e., isoprene), etc. Among these, 1,3-butadiene and isoprene is preferable. Further, the modified conjugated diene-based polymer having the aromatic vinyl monomer content of 10 to 80% by weight, more preferably 10 to 50% by weight, is preferable for maintaining a suitable glass transition temperature. Such a modified conjugated diene-based polymer is obtained, for example, by copolymerizing styrene, as an aromatic vinyl monomer, and butadiene, as a conjugated diene monomer to form a styrene-butadiene copolymer rubber (SBR) and further, by reacting the growing terminal anions of the copolymer and fullerene, to form a fullerene-modified styrene-butadiene copolymer rubber. Further, as other conjugated diene-based polymers, various types of diene-based polymers such as polyisoprene rubber (IR), various types of polybutadiene rubber (BR), styrene-isoprene copolymer rubber, styrene-butadiene-isoprene copolymer rubber, may be used. A modified conjugated diene-based polymer, when polymerizing such a conjugated diene-based polymer, as shown also in the Synthesis Example explained below, can be produced by adding a commercially available fullerene to modify the polymer at the time of completion of polymerization.

As other rubber ingredient compounded into the rubber composition according to the present invention, any diene-based rubber or rubber other than a diene-based rubber usable in a rubber composition can be mentioned. As a representative diene-based rubber, various types of natural rubber (NR), various types of polyisoprene rubber (IR), various types of polybutadiene rubber (BR), various types of styrene-butadiene copolymer rubber (SBR), various types of ethylene-propylene-diene three-way copolymer rubber (EPDM), various types of chloroprene rubber, various types of butyl rubber, various types of halogenated butyl rubber, various types of acrylonitrile-butadiene copolymer rubber etc. may be mentioned. Further, as the non-diene-based rubber, various types of ethylene-propylene copolymer rubber, various types of ethylene-butene copolymer rubber, various types of brominated isobutylene-paramethylstyrene copolymer rubber, various types of epichlorohydrin rubber, various types of silicone rubber, etc. may be mentioned. These may be used alone or in any mixture thereof.

The rubber composition according to the present invention may optionally includes a reinforcing filler and, another compounding agent. As the reinforcing filler, carbon black, silica, etc. is preferably compounded. The compounding amount of the reinforcing filler is not particularly limited, but preferably 5 to 100 parts by weight, more preferably 10 to 90 parts by weight, based upon 100 parts by weight of the rubber component. As the carbon black capable of compounding into the rubber composition according to the present invention, carbon black usable in a rubber composition such as furnace black, acetylene black, thermal black, channel black, graphite, any may be mentioned. As the silica usable in the rubber composition according to the present invention, any silica capable of compounding into a rubber composition may be mentioned.

The rubber composition according to the present invention contains preferably 0.1 to 10 parts by weight, more preferably 0.2 to 7 parts by weight, of a vulcanization agent, based upon 100 parts by weight of the rubber component. In addition, the rubber composition according to the present invention may contain a vulcanization or cross-linking accelerator, various types of oil, an antioxidant, a plasticizer, or other various types of additives generally compounded for rubber use. This formulation may be mixed and vulcanized by a general method to form a composition used for vulcanization or cross-linking. The compounding amounts of these additives may be made any conventional general amounts of compounding, unless the object of the present invention is not adversely affected. The rubber composition according to the present invention is useful as a rubber composition for a tire tread, where a superior balance of modulus and heat buildup and a superior tan δ balance are required. In addition, for example, use for belts, hoses, rubber shock absorbers, rollers, sheets, linings, rubberized cloth, seal materials, gloves, fenders, and various types of pharmaceutical and physicochemical products, civil engineering products, and rubber products for maritime use, automobiles, railroads, office automation, aircraft, packaging, etc. is possible.

EXAMPLES

Examples of the present invention will now be explained, but the present invention is by no means limited to the following Examples.

Example 1 and Comparative Examples 1 to 4

In each formulation shown in Table I (parts by weight), the components other than the vulcanization accelerator and sulfur were mixed by a 0.25 liter internal mixer for 3 to 5 minutes to obtain a master batch, which was then mixed with the vulcanization accelerator and sulfur by an 8-inch open roll to obtain a rubber composition. This composition was press vulcanized in a 15×15×0.2 cm mold at 160° C. for 20 minutes to obtain a rubber sheet.

Each vulcanized rubber sheet obtained above was evaluated by the following method.

300% modulus (MPa): Measured according to JIS K6301 tan δ (60° C.): Value measured using viscoelasticity spectrometer (Toyo Seiki) at a temperature of 60° C. under conditions of an initial strain of 10%, a dynamic strain of ±2%, and a frequency of 20 Hz. Note that when considering tread rubber for a tire, the lower this value, the smaller the rolling resistance and therefore the smaller the heat buildup and the smaller the fuel consumption.

Processability at discharge: State at time of discharge after mixing judged visually.

G: Good

F: Fair

P: Poor

TABLE I

|  | Comp. Ex. 1 | Comp. Ex. 2 | Comp. Ex. 3 | Comp. Ex. 4 | Ex. 1 |
|---|---|---|---|---|---|
| Formulation (parts by weight) | | | | | |
| IR-A[1] | 100 | — | — | — | — |
| IR-B[2] | — | 100 | — | — | — |
| IR-C[3] | — | — | 100 | — | — |
| IR-D[4] | — | — | — | 100 | — |
| IR-FUL[5] | — | — | — | — | 100 |
| Carbon black[6] | 50 | 50 | 50 | 50 | 50 |
| Zinc oxide[7] | 3 | 3 | 3 | 3 | 3 |
| Stearic acid[8] | 2 | 2 | 2 | 2 | 2 |
| Antioxidant[9] | 1 | 1 | 1 | 1 | 1 |
| Vulcanization accelerator NS[10] | 1 | 1 | 1 | 1 | 1 |
| Sulfur[11] | 2 | 2 | 2 | 2 | 2 |
| Evaluated physical properties | | | | | |
| 300% modulus (MPa) | 13.8 | 13.9 | 14.1 | 13.4 | 15.4 |
| tan δ (60° C.) | 0.1499 | 0.1076 | 0.1210 | 0.1358 | 0.1173 |
| Processability upon discharge | G | P | P | F | G |

[1] to [4] Unmodified polyisoprene (see Synthesis Example)
[5] Fullerene-modified polyisoprene (see Synthesis Example)
[6] Shoblack N339 (Showa Cabot)
[7] Zinc White No. 3 (Seido Chemical)
[8] Beads Stearic Acid (Kiri, NOF Corporation)
[9] Santoflex 13 (6C, Monsanto Japan)
[10] Noccelar NS-P (Ouchi Shinko Chemical Industrial)
[11] Oil-extended sulfur (Karuizawa Refinery)

Synthesis Example

The unmodified polyisoprenes IR-A, IR-B, IR-C and IR-D and the modified polyisoprene IR-FUL used were synthesized as follows. The chemical reagents used for the synthesis were as follows.

Cyclohexane and isoprene: Made by Kanto Chemical, dehydrated by Molecular Sieve 4A, and bubbled with nitrogen.

n-Butyl lithium: Made by Kanto Chemical, n-hexane solution 1.6 mol/liter.

Toluene: Made by Kanto Chemical, refluxed in the presence of sodium for about 1 week, checked for deep blue color of benzophenone ketyl (i.e., indicator of dehydration), then distilled.

Fullerene: Tokyo Kasei $C_{60}$>99.9% fullerene degassed and dried.

Synthesis of Unmodified IR-A to IR-D

A nitrogen-substituted 10-liter autoclave reactor was charged with 2830 g of cyclohexane and 517.6 g (7.598 mol) of isoprene, and then stirring started. After the temperature of the content in the reaction vessel reached 50° C., 1.854 ml (2.911 mmol) of n-butyl lithium was added. After the polymerization conversion rate reached 100%, 0.5 ml of methanol was added and the resultant mixture stirred for 10 minutes. The polymer solution thus obtained was given a small amount of an antioxidant (Irganox 1520) and concentrated in vacuo to remove the solvent. The polymer was coagulated in methanol, washed, then dried to obtain polyisoprene. The addition amounts of n-butyl lithium were changed to produce IR-A to IR-D.

The number average molecular weight $M_n$ of the unmodified polyisoprene obtained above was measured by gel permeation chromatography (GPC). The results were as follows:

| IR-A: | 325,000 |
|---|---|
| IR-B: | 941,000 |
| IR-C: | 837,000 |
| IR-D: | 513,000 |

Synthesis of Fullerene-modified IR (IR-FUL)

A nitrogen-substituted 10-liter autoclave reactor was charged with 2272 g of cyclohexane and 204.3 g (2.999 mol) of isoprene, and then stirring started. After the temperature of the content in the reaction vessel reached 50° C., 1.481 ml (2.311 mmol) of n-butyl lithium was added. After the polymerization conversion rate reached 100%, 11.23 g (0.02885 mmol) of a fullerene ($C_{60}$) in a 0.185% by weight toluene solution was added and the resultant mixture stirred for 1 hour. Next, 0.5 ml of methanol was added and the resultant mixture stirred for 1 hour. The polymer solution thus obtained was given a small amount of an antioxidant (Irganox 1520) and the resultant mixture was concentrated in vacuo to remove the solvent. The polymer was coagulated in methanol, washed, then dried to obtain a fullerene-modified polyisoprene. The number average molecular weight $M_n$ was 859000, the result of measurement of the weight average molecular weight $M_w$ by gel permeation chromatography (GPC) was 1202000, and the $M_w/M_n$ was 1.40.

Table I shows the results of the evaluation. Further, FIG. 1 shows the relationship between the modulus and the tan δ at 60° C. In FIG. 1, points A to D show Comparative Examples 1 to 4, while IR-FUL shows Example 1.

Example 2 and Comparative Examples 5 to 7

In each formulation shown in Table II (parts by weight), the components other than the vulcanization accelerator and sulfur were mixed in a 0.25 liter internal mixer for 3 to 5 minutes to obtain a master batch, which was then mixed with the vulcanization accelerator and sulfur by an 8-inch open roll to obtain a rubber composition. This composition was press vulcanized in a 15×15×0.2 cm mold at 160° C. for 20 minutes to obtain a rubber sheet.

Each vulcanized rubber sheet obtained above was evaluated by the following method.

Viscoelasticity: tan δ (60° C.) and tan δ (0° C.) values measured using a viscoelasticity spectrometer (Toyo Seiki) at temperatures of 60° C. and 0° C. under conditions of an initial strain of 10%, a dynamic strain of ±2% and a frequency of 20 Hz and the ratio of the same.

Note that the lower the value of the tan δ (60° C.), the smaller the rolling resistance, therefore the smaller the heat buildup and the smaller the fuel consumption, while the higher the value of the tan δ (0° C.), the larger the wet skid resistance and the better the braking performance on a wet road surface.

Cold flowability: Existence of any change in shape of unvulcanized rubber sheet after allowing to stand for 24 hours was visually observed.

TABLE II

| Formulation (parts by weight) | Comp. Ex. 5 | Comp. Ex. 6 | Comp. Ex. 7 | Ex. 2 |
|---|---|---|---|---|
| SBR-A[1)] $M_w$ 478000[12)] St: 22.1% by weight, Vinyl: 58.5%[13)] | 100 | — | — | — |
| SBR-B[2)] $M_w$ 643000[12)] St: 22.0% by weight, Vinyl: 59.9%[13)] | — | 100 | — | — |
| SBR-NF[3)] $M_w$ 403000[12)] St: 19.9% by weight, Vinyl: 59.9%[13)] | — | — | 100 | — |
| SBR-FCP[4)] $M_w$ 769000[12)] St: 26.0% by weight, Vinyl: 61.3%[13)] | — | — | — | 100 |
| Carbon black[5)] | 60 | 60 | 60 | 60 |
| Zinc oxide[6)] | 3 | 3 | 3 | 3 |
| Stearic acid[7)] | 1 | 1 | 1 | 1 |
| Antioxidant[8)] | 1 | 1 | 1 | 1 |
| Aromatic oil[9)] | 5 | 5 | 5 | 5 |
| Vulcanization accelerator CZ[10)] | 2 | 2 | 2 | 2 |
| Sulfur[11)] | 2 | 2 | 2 | 2 |
| Viscoelasticity | | | | |
| tan δ (60° C.) | 0.201 | 0.204 | 0.277 | 0.187 |
| tan δ (0° C.) | 0.679 | 0.675 | 0.929 | 1.091 |
| tan δ (0° C.)/tan δ (60° C.) | 3.378 | 3.309 | 3.354 | 5.834 |
| Cold flow | | | | |
| 24 hours | Yes | Yes | Yes | No |

[1)]Nipol NS120 (Nippon Zeon)
[2)]JSR SL563 (JSR)
[3)]Unmodified SBR (see Synthesis Example)
[4)]Fullerene-modified SBR (see Synthesis Example)
[5)]Shoblack N339 (Showa Cabot)
[6)]Zinc White No. 3 (Seido Chemical)
[7)]Beads Stearic Acid Kiri (NOF Corporation)
[8)]Santoflex 13, 6C (Monsanto Japan)
[9)]Extract No. 4S (Shell Japan)
[10)]Noccelar CZ-G (Ouchi Shinko Chemical Industrial)
[11)]Oil-extended sulfur (Karuizawa Refinery)
[12)]Weight average molecular weight
[13)]St: Amount of styrene, Vinyl: Amount of vinyl Synthesis Example Note that the reagents used in the following Synthesis Examples were as follows:

Cyclohexane, Styrene: Made by Kanto Chemical, dehydrated by Molecular Sieve 4A, and bubbled with nitrogen.

Butadiene: Made by Japan Petrochemical, purity 99.3%, dehydrated by Molecular Sieve 4A.

n-Butyl lithium: Made by Kanto Chemical, n-hexane solution 1.58 mol/liter.

N,N,N',N'-Tetramethylethyl diamine (TMEDA): Dehydrated by Molecular Sieve 4A and bubbled with nitrogen.

Toluene: Made by Kanto Chemical, refluxed in the presence of metal sodium for about 1 week, checked for deep blue color of benzophenoneketyl (i.e., indicator of dehydration), then distilled.

Fullerene: Tokyo Kasei $C_{60}$>99.9% fullerene dehydrated and dried.

Synthesis of Unmodified SBR(SBR-NF)

A nitrogen-substituted 10-liter autoclave reactor was charged with 3138 g of cyclohexane, 115.6 g (1.110 mol) of styrene, 438.9 g of butadiene (8.172 mol) and 1.102 ml (7.398 mmol) of TMEDA and then stirring started. After the temperature of the content in the reaction vessel reached 50° C., n-butyl lithium was added in an amount of 3.805 ml (5.936 mmol). After the polymerization conversion rate reached 100%, 0.5 ml of methanol was added and the resultant mixture stirred for 30 minutes. The polymer solution obtained was given a small amount of an antioxidant (Irganox 1520) and concentrated in vacuo to remove the solvent. The polymer was coagulated in methanol, washed, then dried to obtain a solid polymer. The amount of styrene of the polymer thus obtained was 19.9% by weight (measured at $^1$H-NMR), the amount of vinyl was 59.9% (measured at $^1$H-NMR), and the weight average molecular weight (Mw) was 403000 (measured by the above-mentioned method).

Synthesis of Fullerene-Modified SBR(SBR-FCP)

A nitrogen-substituted 10-liter autoclave reactor was charged with 3137 g of cyclohexane, 113.8 g (1.093 mol) of styrene, 438.9 g (8.172 mol) of butadiene, and 0.812 ml (5.535 mmol) of TMEDA and stirring started. After the temperature of the content in the reaction vessel reached 50° C., 3.330 ml (5.266 mmol) of n-butyl lithium was added. After the polymerization conversion rate reached 100%, 49.30 g (0.4588 mmol) of a fullerene ($C_{60}$) in a 0.670% by weight toluene solution was added and the resultant mixture stirred for 2 hours. Next, 0.5 ml of methanol was added and the resultant mixture stirred for 1 hour. The polymer solution obtained above was given a small amount of an antioxidant (Irganox 1520) and concentrated in vacuo to remove the solvent. The polymer was coagulated in methanol, washed, then dried to obtain a solid polymer. The styrene content of the polymer obtained was 26.0% by weight, the amount of vinyl was 61.3% and the weight average molecular weight (Mw) was 769000 (measured by the above-mentioned methods).

In each formulation shown in Table II (parts by weight), the components other than the vulcanization accelerator and sulfur were mixed in a 0.6 liter internal mixer for 3 to 5 minutes to obtain a master batch which was mixed with the vulcanization accelerator and sulfur by an 8-inch open roll to obtain a rubber composition. This composition was press vulcanized in a 15×15×0.2 cm mold at 160° C. for 20 minutes to obtain a rubber sheet.

Table II shows the results of the evaluation. Further, FIG. 2 shows the relationship between the weight average molecular weight and the tan δ (0° C.)/tan δ (60° C.) ratio. In FIG. 2, the points A, B and NF show Comparative Examples 5 to 7, while the point FCP shows Example 2.

INDUSTRIAL APPLICABILITY

As explained above, the rubber composition according to the present invention is excellent in the processability, high in the modulus, superior in balance of the modulus and the heat buildup, and excellent in the cold flowability and is superior in the tan δ balance (that is, low in tan δ (60° C.) and high in tan δ (0° C.)), and therefore, is suitable for use, for example, as a rubber for a tire tread, etc.

The invention claimed is:

1. A tire having a tread comprising a rubber composition comprising 100 parts by weight of a rubber component containing a modified conjugated diene-based polymer having a fullerene bonded thereto in an amount of 0.001 to 2 molecules per one molecular chain of the modified conjugated diene-based polymer and a weight average molecular weight of 50,000 or more and present in an amount of 0.5 to 100% by weight based upon the total amount of the rubber component and 5 to 100 parts by weight of a reinforcing filler wherein said reinforcing filler is at least one member selected form the group consisting of carbon black and silica, wherein the modified conjugated diene-based polymer is synthesized by reacting (i) growing terminal anions formed by anionic polymerization of a conjugated diene-based monomer, or an aromatic vinyl monomer and a conjugated diene monomer, and (ii) a fullerene.

2. A tire as claimed in claim 1, wherein the amount of the fullerene bonded to the modified conjugated diene-based polymer is 0.01 to 2 molecules per one molecular chain of the modified conjugated diene-based polymer.

3. A tire as claimed in claim 1, further comprising 0.1 to 10 parts by weight of a vulcanizing agent, based upon 100 parts by weight of the rubber component.

4. A tire as claimed in claim 1, wherein the aromatic vinyl monomer unit forms 10 to 80% by weight of the modified conjugated diene-based polymer.

5. A tire as claimed in claim 2, wherein the modified conjugated diene-based polymer is synthesized by reacting growing terminal anions formed by anionic polymerization of a conjugated diene-based monomer and a fullerene.

6. A tire as claimed in claim 3, wherein the modified conjugated diene-based polymer is synthesized by reacting growing terminal anions formed by anionic polymerization of a conjugated diene-based monomer and a fullerene.

7. A tire as claimed in claim 2, wherein the modified conjugated diene-based polymer is synthesized by reacting growing terminal anions formed by anionic polymerization of an aromatic vinyl monomer and a conjugated diene monomer with a fullerene.

8. A tire as claimed in claim 7, wherein the aromatic vinyl monomer unit forms 10 to 80% by weight of the modified conjugated diene-based polymer.

9. A tire as claimed in claim 3, wherein the modified conjugated diene-based polymer is synthesized by reacting growing terminal anions formed by anionic polymerization of an aromatic vinyl monomer and a conjugated diene monomer with a fullerene.

10. A tire as claimed in claim 9, wherein the aromatic vinyl monomer unit forms 10 to 80% by weight of the modified conjugated diene-based polymer.

11. A tire as claimed in claim 2, further comprising 0.1 to 10 parts by weight of a vulcanizing agent, based upon 100 parts by weight of the rubber component.

12. A tire as claimed in claim 5, further comprising 0.1 to 10 parts by weight of a vulcanizing agent, based upon 100 parts by weight of the rubber component.

* * * * *